US011291081B2

(12) United States Patent
Reisbick et al.

(10) Patent No.: US 11,291,081 B2
(45) Date of Patent: Mar. 29, 2022

(54) HOST-NEUTRAL GATEWAY PROCESSING SYSTEM

(71) Applicant: DISH Network L.L.C., Englewood, CO (US)

(72) Inventors: Richard Reisbick, Westminster, CO (US); Ryan Sullivan, San Francisco, CA (US)

(73) Assignee: DISH Network L.L.C., Englewood, CO (US)

( * ) Notice: Subject to any disclaimer, the term of this patent is extended or adjusted under 35 U.S.C. 154(b) by 189 days.

(21) Appl. No.: 16/697,785

(22) Filed: Nov. 27, 2019

(65) Prior Publication Data

US 2020/0178356 A1 Jun. 4, 2020

Related U.S. Application Data

(60) Provisional application No. 62/773,504, filed on Nov. 30, 2018.

(51) Int. Cl.
| | |
|---|---|
| *H04W 4/00* | (2018.01) |
| *H04W 88/16* | (2009.01) |
| *H04L 67/04* | (2022.01) |
| *H04L 1/18* | (2006.01) |
| *H04L 67/025* | (2022.01) |

(Continued)

(52) U.S. Cl.
CPC .......... *H04W 88/16* (2013.01); *H04L 1/1861* (2013.01); *H04L 67/025* (2013.01); *H04L 67/04* (2013.01); *H04L 67/125* (2013.01); *H04L 67/2809* (2013.01); *H04L 67/2857* (2013.01); *H04L 69/329* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 6,735,630 B1 * | 5/2004 | Gelvin | B60R 25/33 709/224 |
| 6,832,251 B1 * | 12/2004 | Gelvin | H04L 67/12 709/224 |

(Continued)

FOREIGN PATENT DOCUMENTS

WO 2017/107123 A1 6/2017

OTHER PUBLICATIONS

International Search Report and Written Opinion for PCT/US2019/063847 dated Feb. 25, 2020, all pages.

(Continued)

*Primary Examiner* — Bob A Phunkulh
(74) *Attorney, Agent, or Firm* — Kilpatrick Townsend & Stockton LLP (57) ABSTRACT

Various embodiments of a host-neutral gateway device are presented herein. A host-neutral gateway device can include a plurality of local wireless communication interfaces that communicate with a plurality of sets of wireless devices. The host-neutral gateway device can include a plurality of long-range wireless communication interfaces that communicate with one or more remote server systems. The host-neutral gateway device can be programmed to execute a plurality of operator-specific applications. Each operator-specific application may be mapped to a corresponding set of wireless devices of the plurality of sets of wireless devices.

19 Claims, 6 Drawing Sheets

(51) Int. Cl.
*H04L 69/329* (2022.01)
*H04L 67/125* (2022.01)
*H04L 67/562* (2022.01)
*H04L 67/5683* (2022.01)
*H04L 67/12* (2022.01)

(56) References Cited

U.S. PATENT DOCUMENTS

| | | | |
|---|---|---|---|
| 6,859,831 B1* | 2/2005 | Gelvin | G08B 25/007 709/224 |
| 6,891,838 B1* | 5/2005 | Petite | H04L 12/2825 340/870.02 |
| 8,816,879 B2 | 8/2014 | Stefik et al. | |
| 8,823,520 B2 | 9/2014 | Ly et al. | |
| 10,991,249 B2 | 4/2021 | Reisbick et al. | |
| 2001/0024163 A1* | 9/2001 | Petite | G08B 17/10 340/628 |
| 2002/0027499 A1 | 3/2002 | Chainer et al. | |
| 2008/0274766 A1 | 11/2008 | Pratt et al. | |
| 2008/0294020 A1 | 11/2008 | Sapounas | |
| 2010/0085948 A1 | 4/2010 | Yu et al. | |
| 2010/0125641 A1* | 5/2010 | Shelby | H04L 69/04 709/206 |
| 2012/0026890 A1* | 2/2012 | Banka | H04L 67/125 370/242 |
| 2013/0073303 A1* | 3/2013 | Hsu | H04L 12/2825 705/2 |
| 2013/0073350 A1 | 3/2013 | Blustein | |
| 2013/0311140 A1 | 11/2013 | Schechter | |
| 2014/0072178 A1 | 3/2014 | Carbonell et al. | |
| 2014/0207280 A1* | 7/2014 | Duffley | A47L 9/2857 700/257 |
| 2014/0321480 A1* | 10/2014 | Xue | H04L 61/3015 370/475 |
| 2015/0288604 A1* | 10/2015 | Boudreaux | H04L 45/74 370/328 |
| 2015/0310745 A1 | 10/2015 | Osment | |
| 2015/0369618 A1 | 12/2015 | Barnard et al. | |
| 2015/0381737 A1 | 12/2015 | Quinn et al. | |
| 2016/0217388 A1* | 7/2016 | Okanohara | G06N 20/00 |
| 2016/0285920 A1* | 9/2016 | Kuo | H04L 67/303 |
| 2017/0025008 A1 | 1/2017 | Gignac et al. | |
| 2017/0092130 A1 | 3/2017 | Bostick et al. | |
| 2017/0098374 A1* | 4/2017 | Sullivan | H04W 4/44 |
| 2017/0129483 A1 | 5/2017 | Li et al. | |
| 2017/0134536 A1 | 5/2017 | Tessiore et al. | |
| 2017/0148230 A1 | 5/2017 | Richard | |
| 2017/0353924 A1* | 12/2017 | Van Rattinghe | H04L 12/12 |
| 2018/0046777 A1* | 2/2018 | Wachman | G16H 40/67 |
| 2018/0060159 A1* | 3/2018 | Justin | G06F 11/0787 |
| 2018/0062959 A1* | 3/2018 | Justin | A61B 5/01 |
| 2018/0152502 A1* | 5/2018 | Kirby | H04L 67/32 |
| 2018/0198641 A1 | 7/2018 | Gilani et al. | |
| 2018/0295066 A1* | 10/2018 | Pawar | H04L 47/724 |
| 2018/0306609 A1* | 10/2018 | Agarwal | H04W 4/38 |
| 2018/0351761 A1 | 12/2018 | Li et al. | |
| 2018/0375750 A1* | 12/2018 | Moeller | G06Q 10/0833 |
| 2019/0122050 A1 | 4/2019 | Beals et al. | |
| 2020/0162556 A1* | 5/2020 | Wood | G06Q 30/00 |

OTHER PUBLICATIONS

International Search Report and Written Opinion for PCT/US2019/063529 dated Feb. 21, 2020, all pages.

* cited by examiner

| Operator | Default Long-Range Communication Interface | Bandwidth Usage (kb) | Operator-Selected Alternative Communication Interface | Bandwidth Usage (kb) | Higher-Ranked Gateway-Selected Alternative Communication Interface Bandwidth (kb) | Lower-Ranked Gateway-Selected Alternative Communication Interface Bandwidth (kb) |
|---|---|---|---|---|---|---|
| 34598A | NB-IoT | 145785 | 5G | 33483 | 323 | 122 |
| 21B230 | 4G | 320494 | NB-IoT | 2349 | 299 | 54 |
| CB344A | NB-IoT | 39434 | 4G | 1005 | 2757 | 3552 |
| 6DF049 | WLAN | 34590845 | 5G | 903 | 0 | 238349 |

FIG. 6

HOST-NEUTRAL GATEWAY PROCESSING SYSTEM

CROSS REFERENCE TO RELATED APPLICATION

This application claims priority to U.S. Provisional Application No. 62/773,504, entitled "Host-Neutral Gateway Processing System," filed on Nov. 30, 2018, the entire disclosure of which is hereby incorporated by reference for all purposes.

BACKGROUND

"Smart" devices may require a way to communicate with a remote computer system to be fully functional. Smart devices can include parking sensors, smart-home devices, environmental sensors, and other forms of devices that typically report data to a remote server system and can perform various functions in response to instructions from the remote server. Obtaining a reliable network connection for each of such devices may be difficult in various urban, suburban, and rural environments.

SUMMARY

Various embodiments are described related to a host-neutral gateway device. In some embodiments, a host-neutral gateway device is described. The device may comprise a plurality of local wireless communication interfaces that may communicate with a plurality of sets of wireless devices. Each set of wireless devices of the plurality of sets of wireless devices may be operated by a different operator. The device may comprise a plurality of long-range wireless communication interfaces that may communicate with one or more remote server systems. The device may comprise one or more processors configured to execute a plurality operator-specific applications. Each operator-specific application may be mapped to a corresponding set of wireless devices of the plurality of sets of wireless device. The one or more processors may be configured to receive, via the plurality of local wireless communication interfaces, a message from a wireless device of the plurality of sets of wireless devices. The one or more processors may be configured to analyze a message header of the message. The one or more processors may be configured to determine, based on the analyzed message header of the message, to process the message using an operator-specific application of the plurality of operator-specific applications. The one or more processors may be configured to process the message using the operator-specific application of the plurality of operator-specific applications specific to the set of wireless devices that comprises the wireless device.

Embodiments of such a device may include one or more of the following features: the one or more processors may be further configured to cause a response to be transmitted to the wireless device based on the processed message via a local wireless communication interface of the plurality of local wireless communication interfaces through which the message may have been received. The one or more processors may be further configured to cause data based on the processed message to be transmitted to a remote server via the plurality of long-range wireless communication interfaces. The one or more processors may be further configured to, based on the message header, select the long-range communication interface from the plurality of long-range communication interfaces to transmit the data based on the processed message to the remote server. The one or more processors may be further configured to receive, via the plurality of local wireless communication interfaces, a second message from a second wireless device of the plurality of sets of wireless devices. The one or more processors may be further configured to analyze a second message header of the second message. The one or more processors may be further configured to determine, based on the analyzed second message header of the second message, to route the second message without local processing. The one or more processors may be further configured to transmit the second message to a second server system without processing being performed by any of the plurality of the operator-specific applications. The one or more processors may be further configured to, based on the second message header, select a long-range communication interface from the plurality of long-range communication interfaces to transmit the data based on the processed message to the remote server system. The one or more processors may be configured to determine to process the message using the operator-specific application may be further based on a locally-stored communication routing table. The device may further comprise a housing that houses the plurality of local wireless communication interfaces. The device may further comprise the plurality of long-range communication interfaces. The device may further comprise the one or more processors. The device may further comprise a door that provides access to an internal region of the housing. The device may further comprise a door sensor, which, when activated by the door being opened, may disable execution of the plurality of operator-specific applications. The device may further comprise a GPS sensor. The one or more processors may be further configured to disable executing of the plurality of operator-specific applications when a location indicated by the GPS sensor may differ by at least a threshold amount from a permissible location. The one or more processors may be further configured to analyze an authorization key for each operator-specific application of the plurality of operator-specific applications. The one or more processors may be further configured to, based on the authorization key, determine whether each operator-specific application of the plurality of operator-specific applications may be permitted to be executed. The one or more processors may be further configured to determine whether an IP address assigned to the host-neutral gateway device falls within a range of permissible IP addresses. The one or more processors may be further configured to disable execution of the plurality of operator-specific applications based on determining that the IP address falls outside of the range of permissible IP addresses.

In some embodiments, a system is described. The system may comprise a first set of wireless devices. The system may comprise a second set of wireless devices. The system may comprise a host-neutral gateway device. The host-neutral gateway device may comprise a plurality of local wireless communication interfaces that may communicate with the first set of wireless devices and the second set of wireless devices. The host-neutral gateway device may comprise a plurality of long-range wireless communication interfaces that may communicate with one or more remote server systems. The host-neutral gateway device may comprise one or more processors. The one or more processors may be configured to execute a first operator-specific application and a second operator-specific application. The first operator-specific application may be mapped to the first set of wireless devices. The first operator-specific application may be mapped to the first set of wireless devices. The one or more processors may be configured to receive, via the plurality of local wireless communication interfaces, a message from a wireless device of the first set of wireless devices. The one or more processors may be configured to analyze a message header of the message. The one or more processors may be configured to determine, based on the analyzed message header of the message, to process the message using the first operator-specific application. The one or more processors may be configured to process the message using the first operator-specific application.

Embodiments of such a system may include one or more of the following features: The first set of wireless devices may be a first type of sensor operated by a first operator and the second set of wireless devices may be a second type of sensor operated by a second operator. The system may further comprise a sensor host system that may communicate with the first set of wireless devices via the host-neutral gateway device. The first set of wireless devices may comprise parking space sensors.

In some embodiments, a method for using a host-neutral gateway device is described. The method may comprise receiving, by the host-neutral gateway device, a data packet from a wireless device. The method may include performing, by the host-neutral gateway device, an analysis on the data packet. The method may include determining, by the host-neutral gateway device, to process the data packet from the wireless device locally in response to performing the analysis on the data packet. The method may comprise providing, by the host-neutral gateway device, the data packet to a locally-executed operator-specific application. The host-neutral gateway device may execute a plurality of operator-specific applications. Each operator-specific application of the plurality of operator-specific applications may correspond to a different set of wireless devices in communication with the host-neutral gateway device. The method may comprise processing, by the host-neutral gateway device, the data packet using the locally-executed operator-specific application. The method may comprise transmitting, by the host-neutral gateway device, data based at least in part on the processed data packet to a remote server system.

Embodiments of such a method may include one or more of the following features: selecting, by operator-specific application, a long-range communication interface. Transmitting the data based at least in part on the processed data packet may be transmitted using the selected long-range communication interface. Selecting the long-range communication interface may be based at least in part on a message header of the data packet. The method may further comprise receiving, by the host-neutral gateway device, a second data packet from a second wireless device. The method may further comprise performing, by the host-neutral gateway device, an analysis on the second data packet. The method may further comprise determining, by the host-neutral gateway device, to transmit the second data packet from the second wireless device without locally processing the second data packet based upon a communication routing table. The method may further comprise transmitting, by the host-neutral gateway device, the second data packet to a second remote server system. The method may further comprise transmitting a response to the wireless device based on the processed data packet via a local wireless communication interface through which the data packet was received.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In various circumstances, an entity, such as a company, organization, or person, may desire to have sensors or other forms of wireless devices deployed that benefit from communication with a remote server operated by the entity or the Internet, generally. While the entity may deploy sensors or wireless devices in an environment, it may be difficult or inefficient for the devices to obtain a network connection to the server or Internet. A gateway device may be used to connect the devices with the Internet to allow for communication with a remote server.

In some situations, however, the sensors or devices may create a significant amount of data that is not efficient to transmit back to a remote server system, especially if the sensors or devices are located in a remote location from which bandwidth via the gateway device is at a premium. The gateway device may be able to execute one or more applications that are specific to the entity that operates the sensors or devices. Such an application may perform processing on the data received from the sensors or devices and may be able to respond to sensors or devices. By processing the data at the gateway device, the volume and/or frequency of data needing to be transmitted to the entity's remote server system may be decreased.

Such a gateway device may be able to communicate using a plurality of local wireless communication interfaces and protocols with a variety of sensors and devices, regardless of the entity that operates the sensors or devices. Further, the gateway device may be able to communicate using multiple long-range wireless and/or wired communication interfaces to communicate with remote server systems and/or the Internet. Further, sensors, devices, and an operator-specific application may be able to provide a preference for the particular long-range wireless communication method to be used (e.g., one long-range method may be faster, but more costly than another).

The gateway device may be designed in such a manner that it is situated within a single, waterproof housing that can be placed outdoors in a convenient location, such as on a telephone pole or lighting structure. Various security features may be implemented that prevent the operation-specific applications from executing and the gateway device from functioning if triggered. Location monitoring, IP (Internet Protocol) monitoring, application signing, and door sensing may be security features implemented to ensure that an unauthorized party does not alter or convert the functionality of the gateway device for nefarious purposes.

Further detailed regarding such a gateway device is provided in relation to the figures. In the following description, an "operator" refers to an entity that deploys and operators sensor devices or other forms of wireless communication devices. An operator may be a company, organization, or individual or group of persons. For example, a first operator may deploy parking sensors to monitor the use of parking spaces, while a second operator may provide credit card processing via wireless devices. Distinct from the operator can be a service provider that operates and deploys the gateway devices. In some situations, the operator and the service provider may be the same entity.

Figure 1:
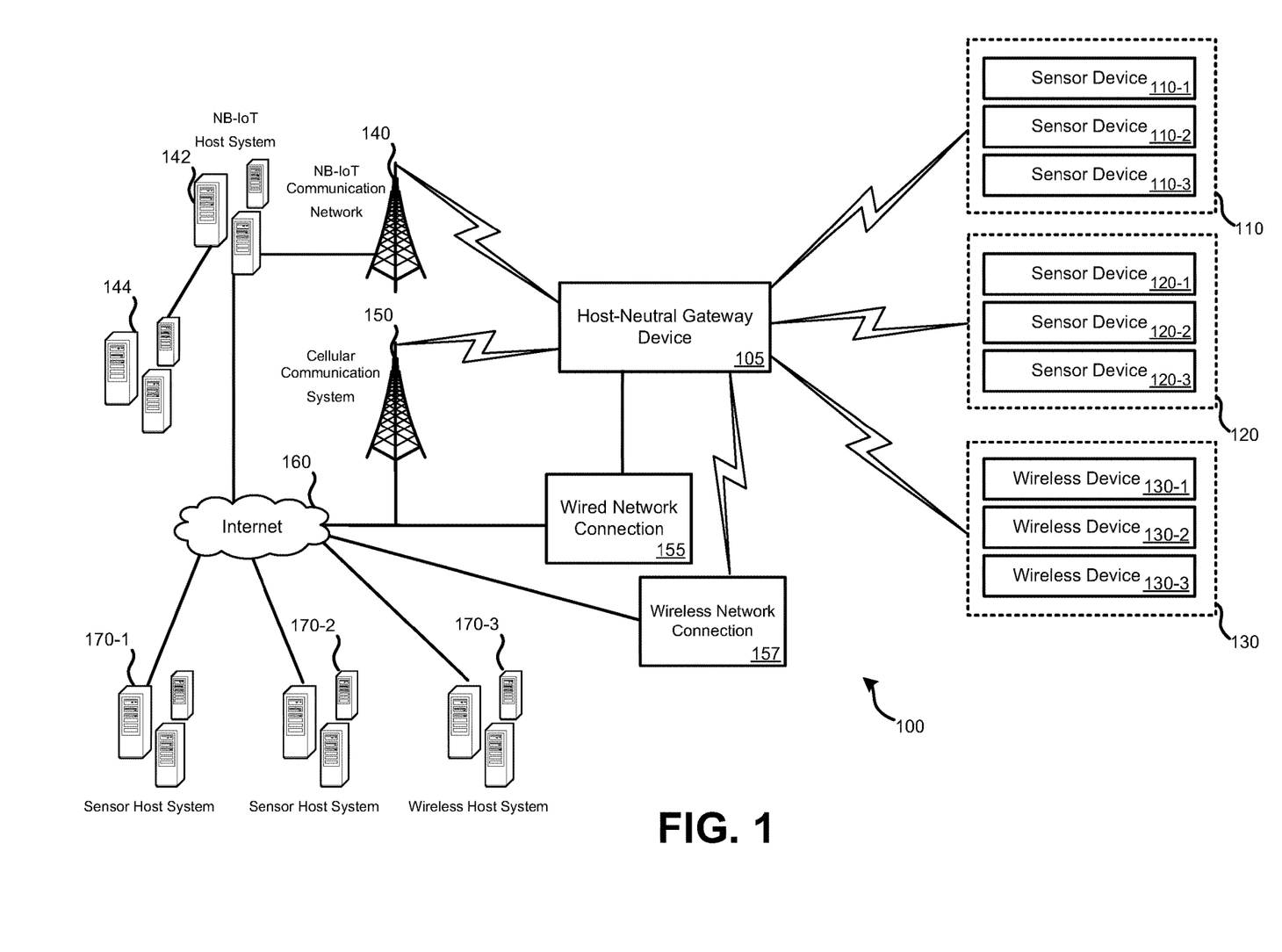
FIG. 1 illustrates an embodiment of a communication system that uses a host-neutral gateway device for processing and routing communications.

FIG. 1 illustrates an embodiment of a communication system 100 that uses a host-neutral gateway device 105 for processing and routing communications. Communication system may include: host-neutral gateway device 105; sensor devices 110 (110-1, 110-2, 110-3); sensor devices 120 (120-1, 120-2, 120-3); wireless devices 130 (130-1, 130-2, 130-3). NB-IoT system 140; NB-IoT host system 142; NB-IoT direct-link server system 144; cellular communication system 150; wired network connection 155; the Internet 160; and host systems 170 (170-1, 170-2, and 170-3).

Host-neutral gateway device 105 (also referred to as "gateway device 105") may serve as a gateway between sensor devices 110, sensor devices 120, wireless devices 130, the Internet, and host systems 170. Gateway device 105 may perform local processing and routing among such devices and systems. Further detail regarding gateway device 105 is provided in relation to FIG. 2.

Gateway device 105 may communicate with various sensor devices and other forms of wireless devices. Such wireless devices may be operated by different operators. That is, sensors devices 110 may be operated by a different operator and be unrelated to sensor devices 120 and wireless devices 130. No communication between sensor devices 110 and sensor device 120 may occur. Gateway device 105 may keep data from sensor devices 110 separated from data related to sensor devices 120 and wireless devices 130. The function of sensor devices 110, sensor devices 120, and wireless devices 130 may vary. Functions that may be possible include: parking space sensors; credit card processing; weather sensors; environmental sensors; gunshot sensors; motion sensing; utility usage reporting (e.g., gas meter, water meter, electric meter); and video monitoring. For short, the term "wireless devices" is used within this document to refer to sensor devices and other forms of wireless devices that can perform functions other than sensing. In some embodiments, wired devices may be wired to gateway device 105.

In the illustrated embodiment of FIG. 1, three sensors devices 110, three sensor devices 120, and three wireless devices 130 are illustrated as an example. Such numbers and groups of sensor devices is only an example. Gateway device 105 may communicate with between one and hundreds or thousands of sensor or wireless devices associated with a particular operator. Further, gateway device 105 may communicate with sensors or wireless devices deployed by a single operator or up to hundreds of operators. As a simple example, a first operator may deploy hundreds of parking sensors that communication with gateway device 105 while a second operator may deploy a single credit-card processing wireless device that communicates with gateway device 105.

As illustrated, only one gateway device, gateway device 105, is illustrated. Many additional gateway devices may be deployed in a geographically-dispersed arrangement that each communicate with differing groups of sensors and/or wireless devices, operated by one or more different operators. Each of gateway devices may have one or more possible communication methods with Internet 160 and host systems 170.

Gateway device 105 may be able to communicate via one or more communication methods with remote networks and host systems. In the illustrated embodiment, gateway device 105 can communicate with Narrowband Internet-of-Things (NB-IoT) network 140. NB-IoT network 140 may permit low-bandwidth communication over a relatively large distance from a single communication tower. For instance, an NB-IoT network may allow for 250 kilobits per second over a single narrow-band, such as of 200 kHz. NB-IoT network 140 may communicate with NB-IoT host system 142. NB-IoT host system 142 may provide for additional processing capabilities on data obtained from sensor devices and wireless devices that communicate with gateway device 105. Additionally or alternatively, NB-IoT host system 142 may serve as an interface between NB-IoT network 140 and the Internet 160. In some embodiments, a server system 144 may be connected with NB-IoT host system 142 via a communication arrangement other than the Internet, such as a private local area network (LAN). Server system 144 may be operated by a particular operator and may receive and process data from a particular group of associated sensors or wireless devices.

Gateway device 105 may additionally or alternatively be able to communicate with Internet 160 via cellular communication system 150. Gateway device 105 may use a 3G, 4G, 5G, 6G, LTE, or some other form of cellular network to access the Internet 160. In some embodiments, such a communication arrangement may be significantly higher bandwidth than NB-IoT network 140, but may be more expensive to access. Additionally or alternatively, gateway device 105 may have a wired network connection 155, such as via an Ethernet, to communicate with Internet 160. Alternatively or additionally, other forms of communication to access the Internet 160 are possible. For example, in some embodiments, gateway device 105 may use a wireless network connection 157, such as by accessing a Wi-Fi network access point to access Internet 160 or a wide-area wireless network.

Various host systems, such as sensor host system 170-1, sensor host system 170-2, and wireless host system 170-3 may communicate with sensor devices 110, sensor devices 120, and wireless devices 130, respectively via Internet 160 and gateway device 105. Since each group of sensor devices and wireless devices 130 are operated by distinct operators, each group may communicate with a different host system. For example, sensor devices 110 may only communicate with sensor host system 170-1; sensor devices 120 may only communicate with sensor host system 170-2; and wireless host system 170-3 may only communicate with wireless devices 130. In some embodiments, sensor devices and wireless devices may also access third-party resources via Internet 160 (and, thus, may not be restricted to communicating with an associated host server system).

Host systems 170 may also be permitted to initiate communication with associated devices via gateway device 105. Therefore, for example, if a firmware update is to be provided to sensor device 110-2, sensor host system 170-1 may send the update for communication to sensor device 110-2 to gateway device 105, which in turn sends the update to sensor device 110-2.

Figure 2:
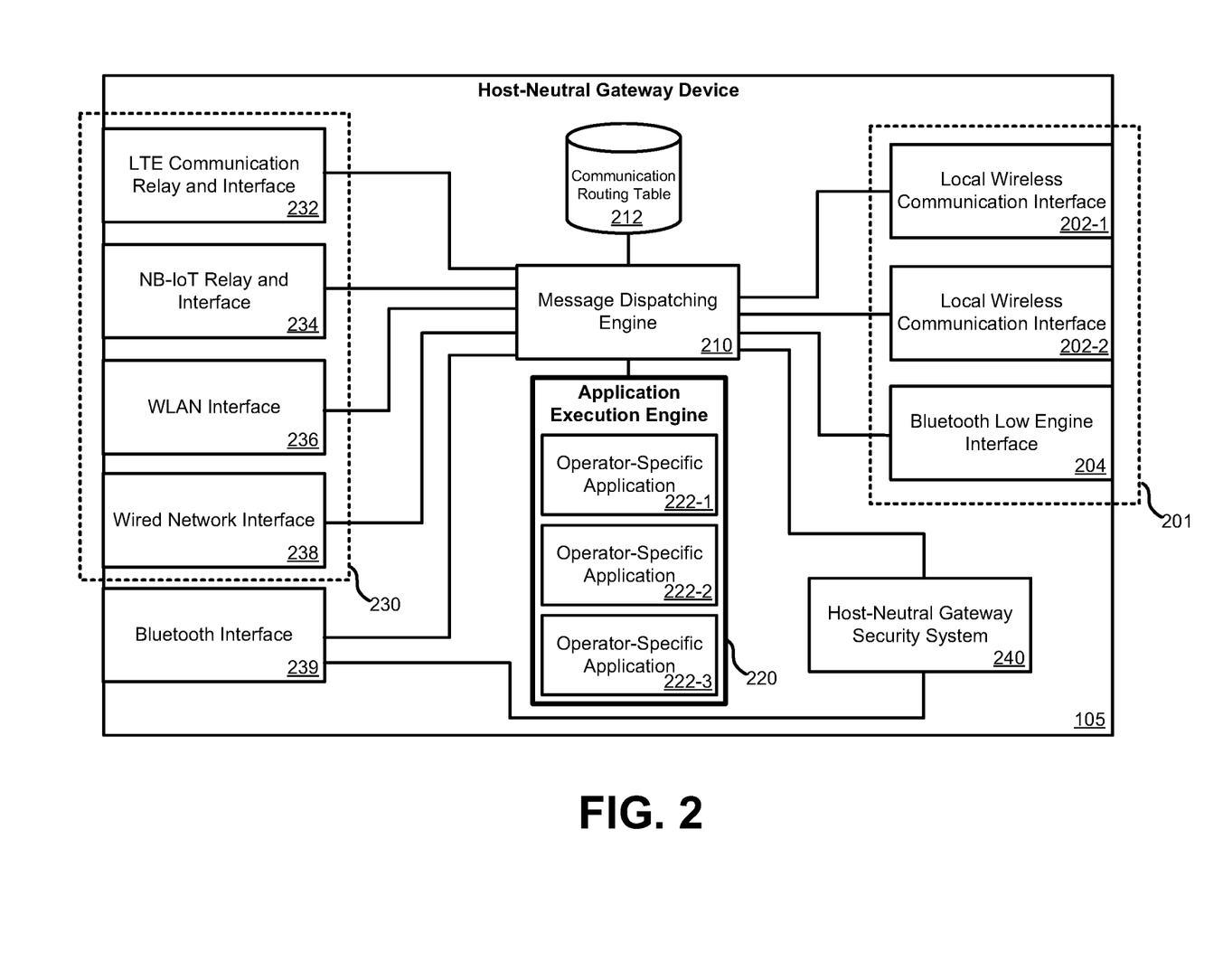
FIG. 2 illustrates a block diagram of an embodiment of a host-neutral gateway device.

FIG. 2 illustrates a block diagram of an embodiment of a host-neutral gateway device 105. Gateway device 105 may be implemented as a device within a single housing. Gateway device 105 may be configured to be installed outdoors or indoors. The housing of gateway device 105 may be waterproof for an outdoors installation. Gateway device 105 may be installed outdoors in a location that is unlikely to be interfered with by people and is likely to have few obstacles between its communication interfaces and the sensor or device with which it communicates. For example, gateway device 105 may be installed on a telephone pole or lighting pole at an elevated location.

Gateway device 105 may include: local wireless communication interfaces 202 (202-1, 202-2); Bluetooth® or Bluetooth Low Energy® (BLE) Interface 204; message dispatching engine 210; communication routing table 212; application execution engine 220; LTE communication relation and interface 232; NB-IoT relay and interface 234; WLAN interface 236; wired network interface 238; Bluetooth® interface 239; and host-neutral gateway security system 240.

Local wireless communication interfaces 201 may each be implemented using separate expansion cards that connect with expansion slots that communicate with componentry of gateway device 105. Such an architecture allows for additional local wireless communication interfaces to be added or substituted for any local wireless communication interface that is not needed. Additionally or alternatively, it may be beneficial to have multiple instances of the same type of local wireless communication interface, such as detailed below in relation to 433 MHz communication.

Local wireless communication interfaces 201 may permit gateway device 105 to communicate with a variety of different types of sensor devices and wireless devices. Each of local wireless communication interfaces 201 may be connected with an appropriate antenna. Two local wireless communication interfaces 202 are illustrated, in other embodiments fewer or greater numbers of different wireless communication interfaces may be present. Local wireless communication interface 202-1 may be able to communicate on 433 MHz with sensor and wireless devices associated with one or more operators. Local wireless communication interface 202-1 may only be able to communicate with a finite number of sensors. Therefore, in some situations, it may be beneficial to have multiple instances of the same type of local wireless communication interface to be able to communicate with an increased number of sensors or to isolate the sensors of different operators on different local wireless communication interfaces.

Local wireless communication interface 202-2 may be able to communicate on 915 MHz with sensor and wireless devices associated with one or more operators. Other frequencies are possible, including 700 MHz and 2.4 GHz. Various communication protocols may be used on each of these frequency bands. Further, the header for each data packet transmitted to gateway device 105 may be standardized; however, the data payload within each packet may not need to be interpreted by gateway device 105. Rather, the data payload may be interpreted by an associated operator-specific operation or may be routed by the gateway to a remote server system or third-party internet resource. BLE interface 204 may allow for BLE-based communication with various wireless devices and sensor devices. In other embodiments, greater or fewer numbers of interfaces to communicate with wireless devices and sensor devices may be present. In some embodiments, wired interfaces may be used to communicate with some sensor devices or other forms of devices.

Message dispatching engine 210 may communicate with each interface of local wireless communication interfaces 201. Messages received by local wireless communication interfaces 201 may be routed to message dispatching engine 210. Message dispatching engine 210 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD). Message dispatching engine 210 may analyze a received message and determine: 1) whether to transmit to a remote server system; 2) if yes, which long-range communication interface to use; and 3) determine whether local processing is to be performed by an associated operator-specific application. Message dispatching engine 210 may analyze a received message header based on data stored in communication routing table 212.

Each message header of a data packet received from a sensor device or wireless device may be in the form of: "source_org_id:source_ext_id". Source_org_id may be a four byte (or some other number of bits or bytes) identifier that is specific to the operator. Therefore, each operator may be mapped to a specific source_org_id. As such, two operators that use gateway devices of communication system 100 may not have a same source_org_id. Source_ext_id may be a four byte (or some other number of bits or bytes) identifier this is specific to the sensor device or wireless device for that specific source_org_id. Therefore, source_ext_ids are unique within the domain of a particular source_org_id. The same source_ext_id may be used for other sensor devices that are associated with a different source_org_id.

Communication routing table 212 may map source_org_ids and source_ext_ids to a particular operator-specific application or sensor host system. By performing a look-up in communication routing table 212, message dispatching engine 210 can determine where the message is to be routed. Table 1 provides an example of how communication routing table 212 may be organized:

TABLE 1

| source_org_id | source_ext_id | Destination |
|---|---|---|
| 3E 29 C3 39 | All | 172.16.254.1 |
| 22 21 A3 F3 | 00 00 00 01-00 00 A4 99 | 192.168.2.1 |
| 22 21 A3 F3 | 00 00 A4 99-CD 00 FF | Pass to Operator-Specific Application 2 |
| AF 01 27 13 | All | Pass to Operator-Specific Application 5 |

As illustrated, when a data packet is received, message dispatching engine 210 may be used to perform a look-up in communication routing table 212 to determine how the received data packet should be handled. Message dispatching engine 210 may: 1) pass the data packet to an operator-specific application that has been mapped to the source_org_id and source_ext_id indicated in the message header; or 2) cause the data packet to be transmitted to a remote distance via one of long-range communication interfaces 230.

In some embodiments, communication routing table 212 may include additional data, including a "dest_org" and "dest_id" mapped to each source_org_id and source_ext_id. Dest_org and dest_id may each be a four byte value that is used to determine the destination to where message dispatching engine 210 is to transmit the data packet. Every operator may be assigned a unique dest_org. The dest_org and dest_id may be used to lookup or construct a destination IP address to which the data packet is to be transmitted by message dispatching engine 210. For instance, the dest_org and dest_id may be used to address data to be transmitted to a particular sensor host system.

Additionally or alternatively, the packet header may specify a universal resource locator (URL). A URL may be included in the packet header when the data packet is to be routed to a third-party resource accessible via Internet 160. For example, a wireless device being used to process credit card transactions may use a URL to contact a credit card processor that is distinct from the operator that operates the wireless device.

Additionally or alternatively, the packet header may indicate one or more preferred long-range communication interfaces. If the preferred long-range communication interface is available, it may be used for communication. If no communication interface is specified, a default long-range communication interface that is associated with the operator and is available may be used. While a preference may be provided for particular long-range communication method, message dispatching engine 210 may make the ultimate decision as to the long-range communication method used. This decision may be based on the quantity and urgency of the data to be transmitted as well as the availability of the requested long-range communication interface. The urgency of the data to be transmitted may be determined based on data included in the header of a particular data packet or series of data packets.

Application execution engine 220 may receive data packets from message dispatching engine 210 and pass a received data packet to the appropriate operator-specific application based on communication routing table 212. In the illustrated examiner, application executing engine is executing three operator-specific applications 222 (222-1, 222-2, and 222-3). Each operator-specific application may be code supplied by the operator and executed by application execution engine 220 on behalf of the operator. From a remote server system, such as host systems 170 and server system 144, operator-specific application code may be transmitted to gateway device 105 for execution. This code may be executed by the gateway device and can only interact with data received from the corresponding operator and the operator's devices that are connected with gateway device 105. Each operator-specific application may perform some level of processing on some or all data packets received from a sensor device or wireless device associated with that operator. Each operator-specific application may communicate with the Internet and/or a corresponding host system via message dispatching engine 210.

By having an operator-specific application perform processing on a received data packet from a sensor device or wireless device, communication via long-range communication interfaces may be decreased or avoided entirely. Such an arrangement may save on data transmission costs and/or decrease the amount of processing required to be performed by the operator's server system. As a first example, an operator-specific application may gather data from a sensor device over a period of time and report a summary of the data to an associated host system of the operator. More specifically, a sensor device may report temperature measurements every second. The operator-specific application may then transmit a high, low, and average temperature to the associated host system once per minute. As a second example, an operator-specific application may be able to process received data from one or more devices and avoid the need to communicate using long-range communication interfaces at all. As an example of this, a first parking space sensor may report that it is unsure whether a parking space is occupied by a vehicle. An associated operator-specific application may analyze data packets for a second parking space sensor in a parking space adjacent to the parking space in which the first parking sensor is located. Based on activity observed by this second parking sensor, the operator-specific application may be able to make a decision as to whether the parking space in which the first parking space sensor is located is occupied.

Long-range communication interfaces 230 may include: LTE (Long Term Evolution) communication relay and interface 232; NB-IoT relay and interface 234; WLAN interface 236; wired network interface 238; and Bluetooth interface 239. Each of long-range communication interfaces 230 may be connected with an appropriate antenna. These exemplary interfaces are by way of example only; for example, in addition to or instead of LTE communication relay and interface 232, a 5G NR communication relay and interface may be installed. LTE communication relay and interface 232 may allow message dispatching engine 210 to transmit and receive messages via a 4G LTE network. Additionally or alternatively, another cellular data communication standard may be used, such as 3G, 4G, 5G, etc. In some embodiments LTE communication relation and interface 232 may serve as a repeater or relay to extend the LTE network. Therefore, other devices capable of communication using the LTE network may be able to utilize the network when such other devices are within range to communicate with LTE communication relay and interface 232 but are out of range of the cellular tower with which LTE communication relay and interface 232 communicates.

NB-IoT communication relay and interface 234 may allow message dispatching engine 210 to transmit and receive messages via an NB-IoT network. In some embodiments NB-IoT communication relation and interface 234 may serve as a repeater or relay to extend the NB-IoT network. Therefore, other devices capable of communication using the NB-IoT network may be able to utilize the network when such other devices are within range to communicate with NB-IoT communication relay and interface 234 but are out of range of the cellular tower with which NB-IoT communication relay and interface 234 communicates.

Other long-range interfaces include: WLAN interface 236 and wired network interface 238. WLAN interface 236 may allow for access to the Internet via a Wi-Fi network. Wired network interface 238 may allow for access to the Internet via a wired network, such as an Ethernet connection. It should be understood that additional or fewer long-range communication interfaces may be present in other embodiments. Further, despite a long-range communication interface being present in gateway device 105, such a long-range communication interface may not be connected or able to access a network. For instance, if gateway device 105 is placed in a rural area may only have access to an NB-IoT network. As another example, if gateway device 105 is installed in a suburban area, it may only have access to an NB-IoT network and an LTE network.

Long-range communication interfaces 230 may each be implemented using separate expansion cards that connect with expansion slots that communicate with componentry of gateway device 105. Such an architecture allows for additional long-range communication interfaces to be added or substituted for any long-range communication interface that is not needed.

Bluetooth interface 239 may be used for local access, such as by a service technician that needs to disable host-neutral gateway security system 240. Further detail regarding host-neutral gateway security system is provided in relation to FIG. 3.

Figure 3:
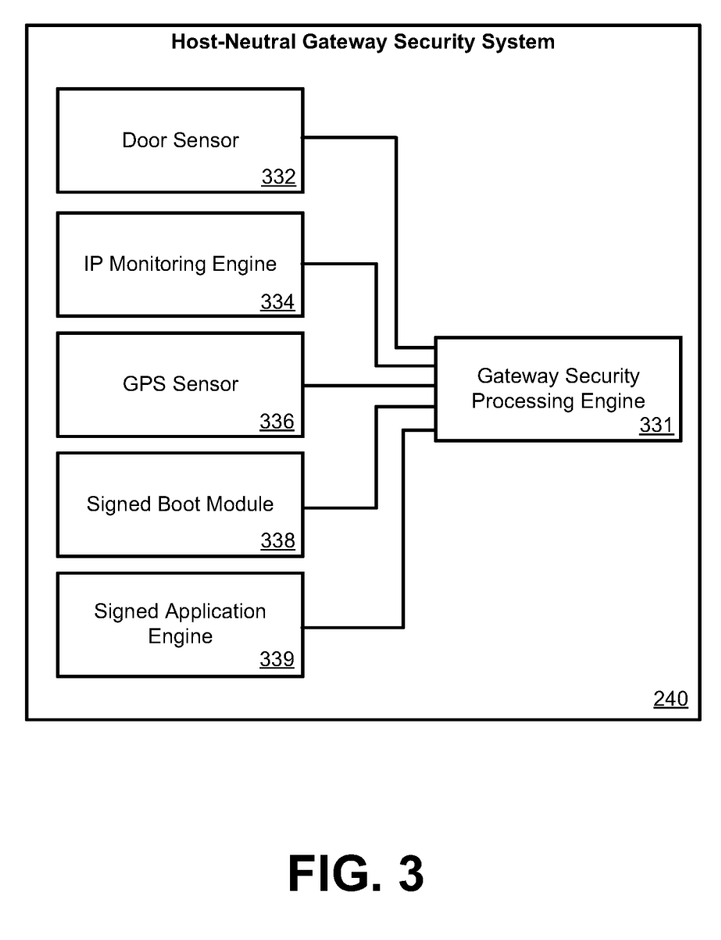
FIG. 3 illustrates a block diagram of an embodiment of a host-neutral gateway security system.

FIG. 3 illustrates a block diagram of an embodiment of a host-neutral gateway security system 300. Host-neutral gateway security system 300 may include: gateway security processing engine 331; door sensor 332; IP monitoring engine 334; GPS sensor 336; encrypted boot module 338; and signed application engine 339. Door sensor 332 may be used to monitor whether a door of a housing of gateway device 105 is opened. If door sensor 332 indicates that a door of gateway device 105 has been opened without a previous service message having been transmitted to gateway security processing engine 331, gateway device 105 may cease functioning. Gateway device 105 ceasing to execute may include message dispatching engine 210 ceasing to route messages among long-range communication interfaces 230 and local wireless communication interfaces 201. In some embodiments, gateway device 105 ceasing to function may include gateway security processing engine 331 actively deleting data from gateway device 105 to prevent gateway device 105 from functioning in the future unless serviced by an authorized entity. For instance, gateway security processing engine 331 may delete communication routing table 212 and/or application keys required to execute operator-specific applications 222.

IP monitoring engine 334 may monitor the IP address assigned to gateway device 105, such as via WLAN interface 236, wired network interface 238, and/or LTE communication relay and interface 232. If the assigned IP address falls outside a particular range, it may be determined that gateway device 105 has been moved and attempted to be connected to a network from an unauthorized location. Gateway device 105 may store an acceptable IP address or acceptable IP address range. If the detected IP address falls outside of the acceptable range, gateway device 105 may cease functioning as previously detailed.

GPS sensor 336 may be used to detect a location of gateway device 105. If the detected location by GPS sensor 336 is outside of a defined geographic region, Gateway device 105 may cease functioning as previously detailed. The defined geographic region may be stored by gateway security processing engine 331.

Signed boot module 338 may ensure that data used to boot gateway device 105 have not been altered by requiring that the data structures used during the boot process be signed using a digital signature. If the digital signature is not valid, booting of gateway device 105 may not be permitted by gateway security processing engine 331. Signed application engine 339 may require that each operator specific application that is executed by application execution engine 320 have an associated application key. The application key may be used to determine if the code of the associated operator specific application has been changed or modified. If the application key does not match with the operator specific application, execution of that specific operator specific application or functionality of gateway device 105 generally may be disabled.

Gateway security processing engine 331, which may be implemented as one or more special-purpose processors or may be software or firmware that is executed by one or more general-purpose processors, which may include the one or more processors used to execute message dispatching engine 210, may receive data from door sensor 332, IP monitoring engine 334, GPS sensor 336, signed boot module 338, and signed application engine 339. Whether gateway device 105 is permitted to function may be determined by gateway security processing engine 331 based on the data received from IP monitoring engine 334, GPS sensor 336, signed boot module 338, and signed application engine 339.

Figure 4:
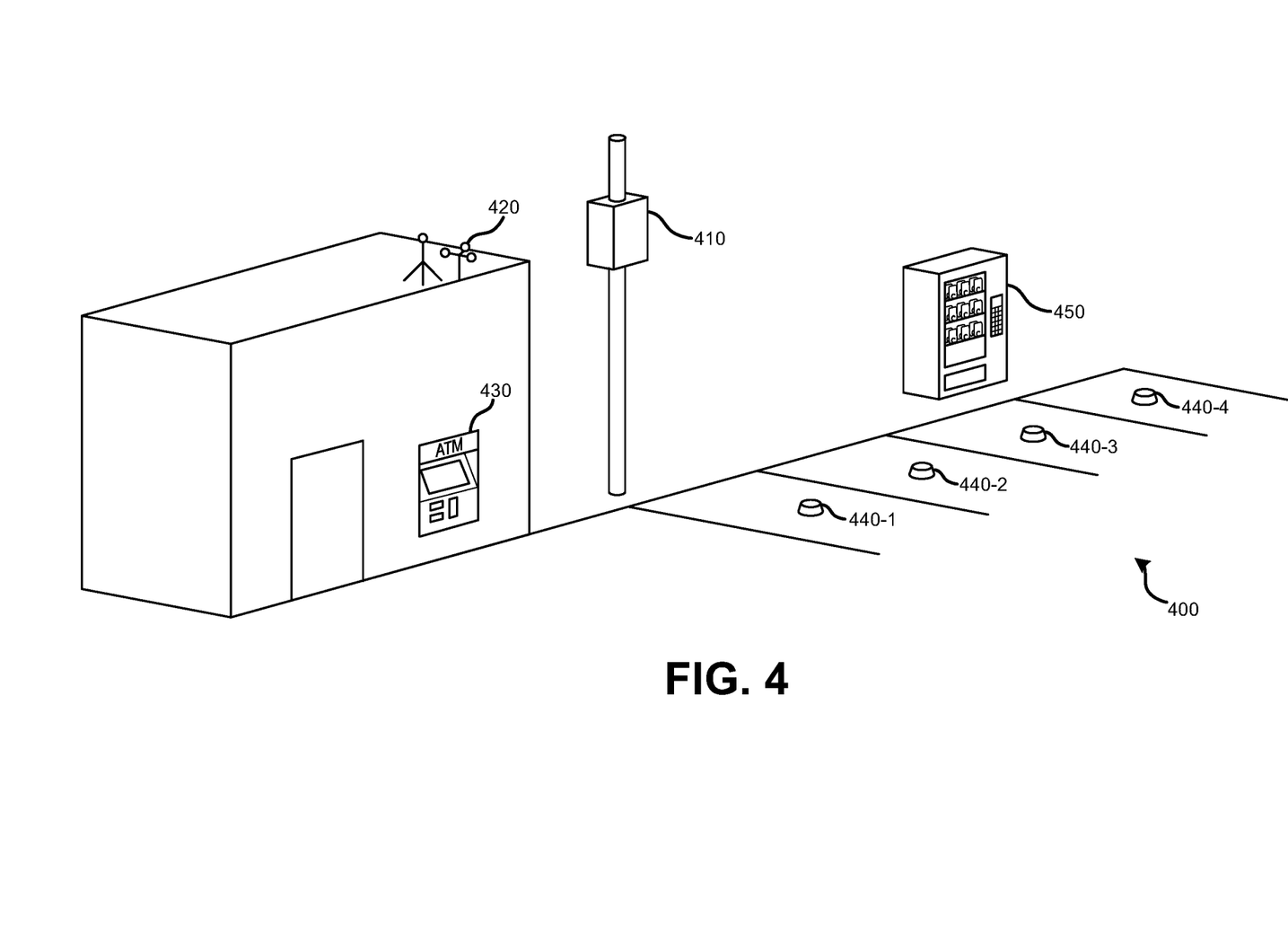
FIG. 4 illustrates an example of an environment in which a field-deployable host-neutral gateway device may be deployed and used.

FIG. 4 illustrates an example of an environment 400 in which a field-deployable host-neutral gateway device may be deployed and used. In environment 400, a gateway device 410 is attached to a light pole or telephone pole. In some embodiments, gateway device 410 may only receive power when a light attached to the light pole is powered on. Gateway device 410 may use this power to charge an on-board battery, which may be used to power gateway device 410 when the light is powered off. In other embodiments, gateway device 410 may be wired to a power source that typically is available. Gateway device 410 may be positioned in a location that makes it difficult for it to be accessed or stolen.

Gateway device 410 may provide Internet access and/or access to one or more remote servers to: weather station 420; automated teller machine 430; vending machine 450; and parking sensors 440. Each of these groups of wireless sensors or wireless devices may be operated by a different operator and may communicate using different wireless communication interfaces; however, each group of wireless sensors or wireless device may communicate with gateway device 410. For some of these devices, an operator-specific application may process received data from the device and provide instructions to the device.

Figure 5:
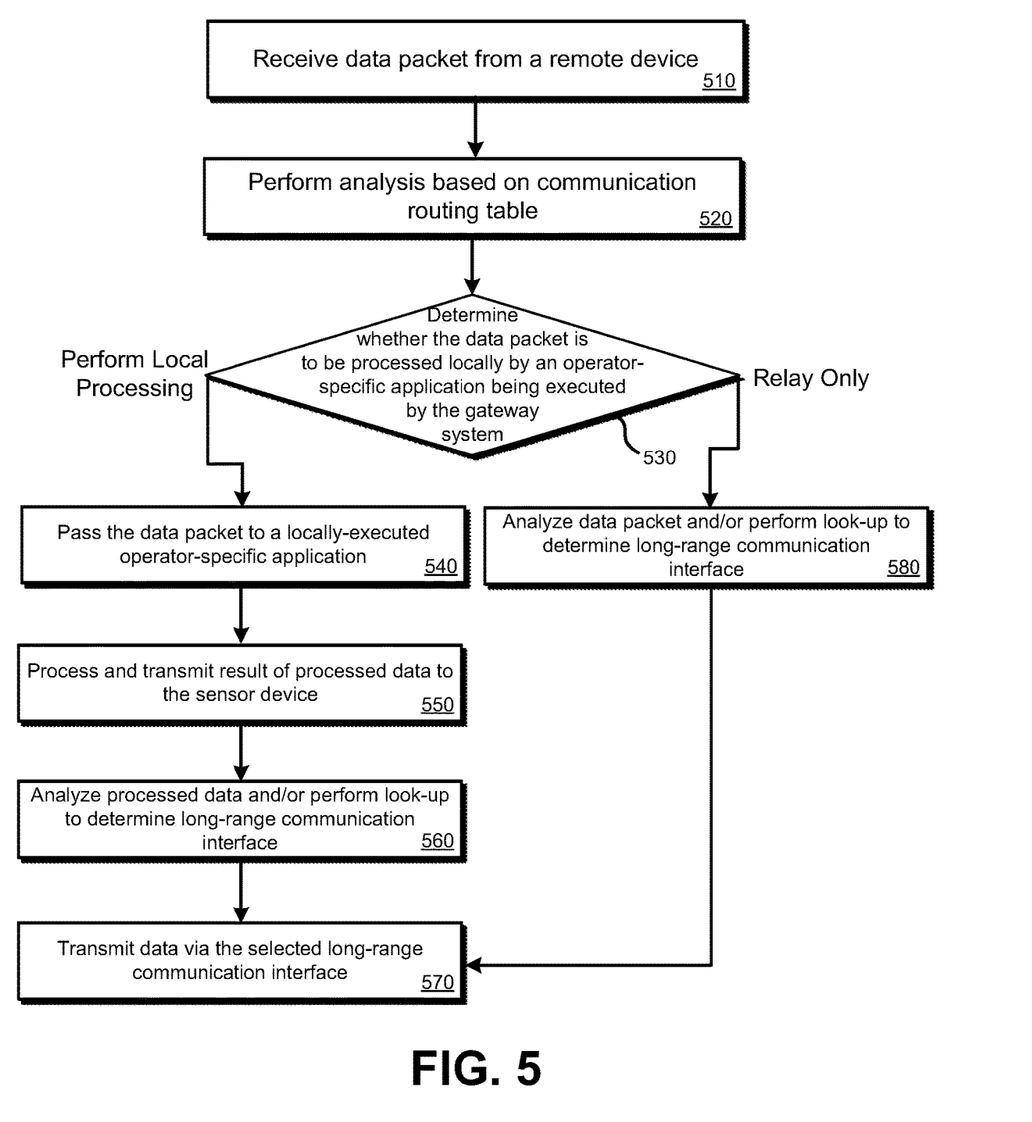
FIG. 5 illustrates an example of a method which may be performed by a host-neutral gateway processing device.

Various methods may be performed using the systems and devices detailed in relation to FIGS. 1-4. FIG. 5 illustrates an example of a method 500 which may be performed by a host-neutral gateway processing device. Each block of method 500 may be performed by gateway device 105 or some other embodiment or form of a gateway device. At block 510, a data packet may be received from a sensor device or other form of wireless device. The data packet may include a header that includes an indication of an operator that operates the sensor device or wireless device and an indication that is unique to the device among all devices operated by the operator. For example, an address of source_org_id-Source_ext_id may be used that identifies the operator and the device. The data packet of block 510 may be received via any of the active local communication interfaces, regardless of which operator is associated with the device.

At block 520, analysis may be performed by the gateway device on the packet header. The indication of the operator and/or the indication of the device may be compared to entries in a communication routing table. The communication routing table may be used to determine how the data packet is to be handled by the gateway device. Based on the analysis of block 520, the gateway device may determine whether the data packet is to be processed locally using an associated operator-specific application that is being executed by the gateway or if the data packet is to be transmitted via a long-range communication interface to a remote server or third-party resource via the Internet at block 530.

If the data packet is to be relayed via a long-range communication interface to a remote server or third-party resource via the Internet, the data packet header may be analyzed to determine whether a preferred long-range communication interface is identified at block 580. The gateway device may make the final decision on which long-range communication interface is to be used for communication. Further detail regarding the selection of the long-range communication interface is provided in relation to FIG. 6. If the gateway device determines that multiple long-range communication interfaces are available, the preference indicated in the data packet may be used. In some embodiments, the gateway device may store defined parameters on the long-range communication interface that is to be used based on: 1) the amount of data being transmitted; and 2) a determined urgency of the data packet. For instance, if the amount of data to be transmitted in association with the data packet header (e.g., a set of data packets) is above a threshold, a long-range communication interface, such as an NB-IoT interface, may be disqualified, unless no other long-range communication interface is available. In some embodiments, rather than a data packet indicating a long-range communication interface, a default long-range communication interface may be selected by the gateway device, such as based on: which long-range communication interfaces are available, and the amount of data to be transmitted. In other embodiments, the communication routing table may indicate a long-range communication interface that is to be used for a data packet based on an identifier of the operator and/or an identifier of the device (e.g., source_org_id-Source_ext_id). At block 570, the data packet may be transmitted using the selected long-range communication interface.

Alternatively, at block 530, if the gateway device determines that an operator-specific application is mapped to the data packet based on an identifier of the operator and/or an identifier of the device (e.g., source_org_id-Source_ext_id), the data packet may be passed to an application execution engine that provides the data packet to the appropriate operator-specific application at block 540. Once routed to the operator-specific application, the operator-specific application manages the content of the data packet. Possible actions that may be performed by the operator-specific application can include: 1) performing processing on the data packet; 2) determine a response to be sent to the device from which the data packet originated; 3) determine a message to be sent to another device with which the gateway device communicates; 4) store data from the data packet; 5) do nothing; and/or 6) transmit data based on the data packet to a remote server system or third party resource. In the illustrated example of FIG. 5, a combination of options one, two, and six are performed.

At block 550, the data packet may be processed by the operator-specific application and the processed data may be transmitted to the sensor device (or other form of device) from which the data packet was received. The result of block 550, may be a confirmation of the received data packet or a response to a query from the sensor device. In other embodiments, a response may be sent to a device (other than the sensor device from which the data packet was received at block 510) that communicates with the gateway device.

At block 560, the operator-specific application may determine that data is to be transmitted via a long-range communication interface to a remote server or third-party resource via the Internet. This data may include or at least be partially based on the data packet received at block 510. The operator-specific application may use a set of operator-defined conditions to determine a preferred long-range communication interface. The gateway device may make the final decision on which long-range communication interface is to be used for communication. However, if the gateway device determines that multiple long-range communication interfaces are available, the preference indicated by the operator-specific application may be used. In some embodiments, the gateway device may store defined parameters on the long-range communication interface that is to be used based on: 1) the amount of data being transmitted; and 2) a determined urgency of the data packet. For instance, if the amount of data to be transmitted is above a threshold, one or more long-range communication interfaces may be disqualified. In some embodiments a default long-range communication interface may be selected by the gateway device, such as based on: which long-range communication interfaces are available, and the amount of data to be transmitted. At block 570, the data packet may be transmitted using the selected long-range communication interface.

Method 500 may be continually repeated for different packets. Since packets from different devices are handled differently, while a first packet is passed to a locally-executed operator-specific application, a second packet may be passed to block 580. Method 500 may be interrupted if a security feature, as detailed in relation to FIG. 3, indicates that the gateway system may have been moved or attempted to be accessed by an unauthorized party. Such a security violation may result in the gateway device ceasing to perform any of its functions, including executing the operator-specific applications and/or forwarding data packets.

Figure 6:
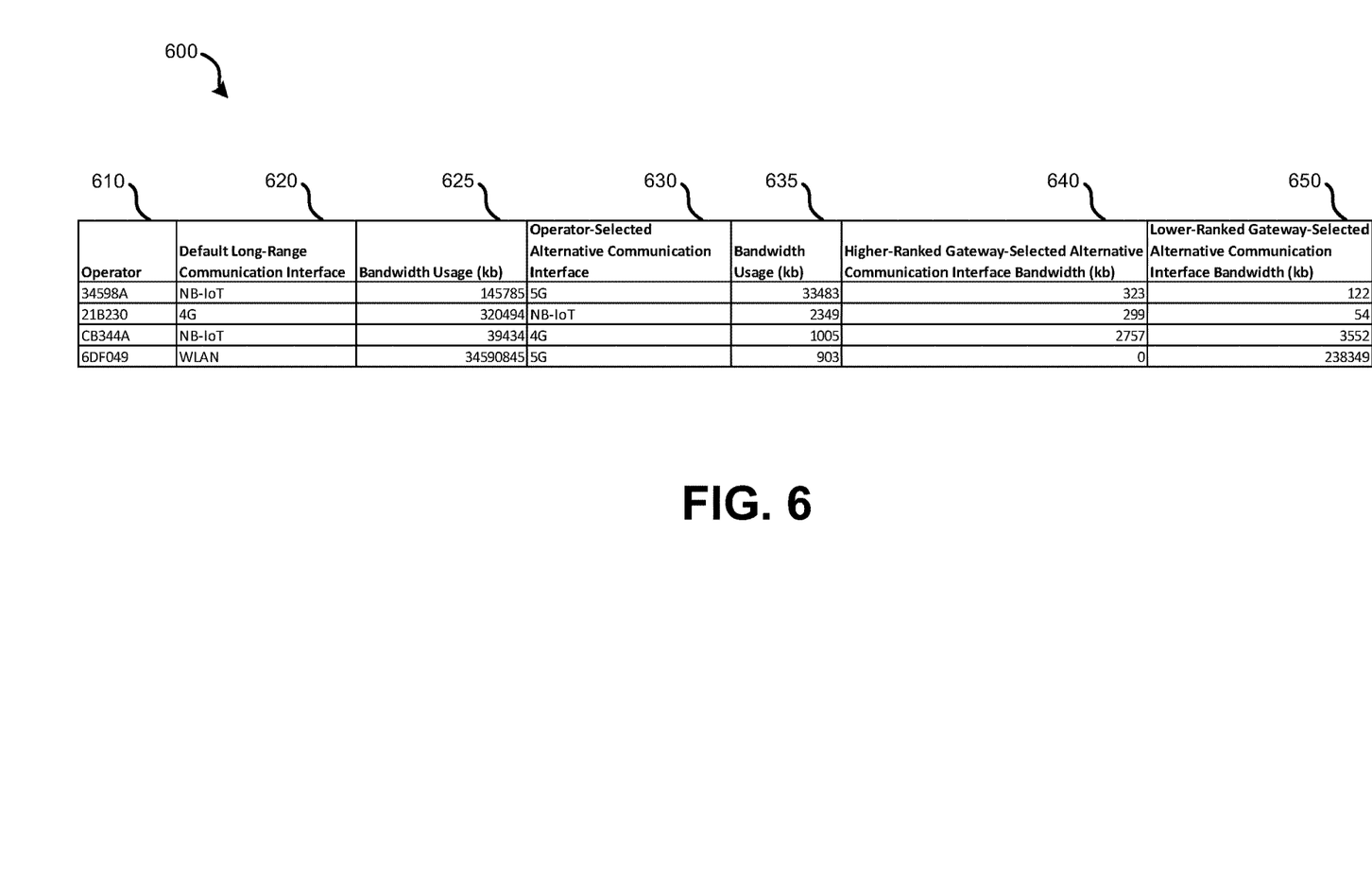
FIG. 6 illustrates an embodiment of a long-range communication tracking table.

As previously noted, while a data packet may indicate a particular long-range communication interface for the gateway to use for communication, the message dispatching engine may have the ultimate authority to determine the long-range communication interface used. Superseding circumstances may prevent an operator's preferable long-range communication interface from being used. For example, if the NB-IoT network is unavailable due to a weak signal, some other communication interface can be used to maintain connectivity. FIG. 6 illustrates an embodiment of a long-range communication tracking table 600. Long-range communication tracking table 600 may be used to track which long-range communication interface is used for data transmitted by the gateway. Table 600 can include: operator 610; default long-range communication interface 620; default bandwidth usage 625; operator-selected alternative communication interface 630; alternative bandwidth usage 635; higher-ranked gateway-selected alternative communication interface bandwidth 640; and lower-ranked gateway-selected alternative communication interface bandwidth 650. Table 600 may be maintained by a gateway device. Periodically or occasionally, the contents of table 600 may be uploaded to a host system maintained by the service provider that operates the gateway system. Data usage information across many gateway devices may be aggregated for individual operators, such as to determine costs that should be billed to the operator.

Operator 610 may indicate the particular operator to which an entry in table 600 is mapped. For operator 610, a default long-range communication interface may be indicated. Therefore, if, for example, data received from a sensor device does not indicate a particular long-range communication interface and, if processing is performed by an operator-specific application, that the application does not select a particular long-range communication interface, the default long-range communication interface that has been set by the operator may be used. The default long-range communication interface may be set based on the operator's bandwidth, latency, and cost requirements. For all data sent using the default long-range communication interface for a given operator, the gateway device may track the bandwidth usage in default bandwidth usage 625. Operator-selected alternative communication interface 630 can indicate a communication interface that is occasionally requested by the operator-specific application or the data received from the sensors. Typically, this data would be "special" in some respect, such as needing greater/smaller bandwidth than typical, or needing better latency than typical. Bandwidth usage 635 may be used to track the amount of bandwidth usage for the operator-selected alternative communication interface. Bandwidth usage may only be recorded to operator-selected bandwidth usage 635 when the data or the operator-specific application explicitly requested the operator-selected alternative communication interface be used.

In some situations, one or more long-range communication interfaces may not be available. For fairness to the operator, tracking may be performed to determine if the alternate communication interface ultimately selected by the message dispatching engine is higher ranked or lower ranked than the long-range communication interface desired by the operator. A higher ranked interface would be considered a communication interface that transmits the data with greater bandwidth (and thus takes less time to transmit) and/or lower latency than the operator's selected long-range communication interface (which could be the default or operator-selected alternative communication interface). A lower ranked interface would be considered a communication interface that transmits the data with less bandwidth (and thus takes longer to transmit) and/or greater latency than the operator's selected long-range communication interface. If the alternative interface selected is a higher ranked interface, the data transmission may still be logged against the operator, such as against a total data transmission allowance allotted to the operator or for billing purposes. If the alternative interface selected is a lower ranked interface, the data transmission may not be logged against the operator, such by being excluded from a total data transmission allowance allotted to the operator or excluded from billing. That is, if the quality of service (QoS) desired by the operator is not met, the operator may not be responsible for costs associated with the data transmission. However, when the QoS desired by the operator is exceeded by a higher-ranked communication interface being used, the operator remains responsible for paying at least an agreed-upon rate for the default communication interface. The data for each operator may be periodically or occasionally transmitted to a server system of the service provider by the gateway device.

A ranking may be established that ranks long-range communication interfaces such that it can be established whether a given long-range communication interface is higher ranked or lower ranked. In some embodiments, different rankings may be established for latency and bandwidth. As an example of one possible ranking, from highest to lowest ranked may be: Wi-Fi; 5G; 4G; then NB-IoT.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A host-neutral gateway device, comprising:
    a plurality of local wireless communication interfaces that communicate with a plurality of sets of wireless devices, wherein each set of wireless devices of the plurality of sets of wireless devices is operated by a different operator;
    a plurality of long-range wireless communication interfaces that communicate with one or more remote server systems;
    one or more processors configured to:
        execute a plurality operator-specific applications, wherein:
            each operator-specific application is mapped to a corresponding set of wireless devices of the plurality of sets of wireless device;
        receive, via the plurality of local wireless communication interfaces, a message from a wireless device of the plurality of sets of wireless devices;
        analyze a message header of the message;
        determine, based on the analyzed message header of the message, to process the message using an operator-specific application of the plurality of operator-specific applications; and process the message using the operator-specific application of the plurality of operator-specific applications specific to the set of wireless devices that comprises the wireless device;
a housing that houses the plurality of local wireless communication interfaces; the plurality of long-range communication interfaces; and the one or more processors;
a door that provides access to an internal region of the housing; and
a door sensor, which, when activated by the door being opened, disables execution of the plurality of operator-specific applications.

2. The host-neutral gateway device of claim 1, wherein the one or more processors are further configured to: cause a response to be transmitted to the wireless device based on the processed message via a local wireless communication interface of the plurality of local wireless communication interfaces through which the message was received.

3. The host-neutral gateway device of claim 1, wherein the one or more processors are further configured to cause data based on the processed message to be transmitted to a remote server via the plurality of long-range wireless communication interfaces.

4. The host-neutral gateway device of claim 3, wherein the one or more processors are further configured to, based on the message header, select a long-range communication interface from the plurality of long-range communication interfaces to transmit the data based on the processed message to the remote server.

5. The host-neutral gateway device of claim 1, wherein the one or more processors are further configured to:
receive, via the plurality of local wireless communication interfaces, a second message from a second wireless device of the plurality of sets of wireless devices;
analyze a second message header of the second message;
determine, based on the analyzed second message header of the second message, to route the second message without local processing; and
transmit the second message to a second server system without processing being performed by any of the plurality of the operator-specific applications.

6. The host-neutral gateway device of claim 5, wherein the one or more processors are further configured to, based on the second message header, select a long-range communication interface from the plurality of long-range communication interfaces to transmit the data based on the processed message to a remote server system.

7. The host-neutral gateway device of claim 1, wherein the one or more processors being configured to determine to process the message using the operator-specific application is further based on a locally-stored communication routing table.

8. The host-neutral gateway device of claim 1, further comprising:
a GPS sensor, wherein the one or more processors are further configured to disable executing of the plurality of operator-specific applications when a location indicated by the GPS sensor differs by at least a threshold amount from a permissible location.

9. A host-neutral gateway device, comprising:
a plurality of local wireless communication interfaces that communicate with a plurality of sets of wireless devices, wherein each set of wireless devices of the plurality of sets of wireless devices is operated by a different operator;
a plurality of long-range wireless communication interfaces that communicate with one or more remote server systems;
one or more processors configured to:
execute a plurality operator-specific applications, wherein:
each operator-specific application is mapped to a corresponding set of wireless devices of the plurality of sets of wireless device;
receive, via the plurality of local wireless communication interfaces, a message from a wireless device of the plurality of sets of wireless devices;
analyze a message header of the message;
determine, based on the analyzed message header of the message, to process the message using an operator-specific application of the plurality of operator-specific applications;
process the message using the operator-specific application of the plurality of operator-specific applications specific to the set of wireless devices that comprises the wireless device;
analyze an authorization key for each operator-specific application of the plurality of operator-specific applications; and
based on the authorization key, determine whether each operator-specific application of the plurality of operator-specific applications is permitted to be executed.

10. A host-neutral gateway device, comprising:
a plurality of local wireless communication interfaces that communicate with a plurality of sets of wireless devices, wherein each set of wireless devices of the plurality of sets of wireless devices is operated by a different operator;
a plurality of long-range wireless communication interfaces that communicate with one or more remote server systems;
one or more processors configured to:
execute a plurality operator-specific applications, wherein:
each operator-specific application is mapped to a corresponding set of wireless devices of the plurality of sets of wireless device;
receive, via the plurality of local wireless communication interfaces, a message from a wireless device of the plurality of sets of wireless devices;
analyze a message header of the message;
determine, based on the analyzed message header of the message, to process the message using an operator-specific application of the plurality of operator-specific applications;
process the message using the operator-specific application of the plurality of operator-specific applications specific to the set of wireless devices that comprises the wireless device;
determine whether an IP address assigned to the host-neutral gateway device falls within a range of permissible IP addresses; and
disable execution of the plurality of operator-specific applications based on determining that the IP address falls outside of the range of permissible IP addresses.

11. A system, comprising:
a first set of wireless devices;
a second set of wireless devices; and
host-neutral gateway device, comprising:

a plurality of local wireless communication interfaces that communicate with the first set of wireless devices and the second set of wireless devices;

a plurality of long-range wireless communication interfaces that communicate with one or more remote server systems; and one or more processors configured to:
execute a first operator-specific application and a second operator-specific application, wherein:
the first operator-specific application is mapped to the first set of wireless devices; and
the first operator-specific application is mapped to the first set of wireless devices;
receive, via the plurality of local wireless communication interfaces, a message from a wireless device of the first set of wireless devices;
analyze a message header of the message;
determine, based on the analyzed message header of the message, to process the message using the first operator-specific application;
process the message using the first operator-specific application;
analyze an authorization key for each operator-specific application of the first operator-specific application and the second operator-specific application; and
based on the authorization key, determine whether the first operator-specific application and the second operator-specific application are permitted to be executed.

12. The system of claim 11, wherein the first set of wireless devices is a first type of sensor operated by a first operator and the second set of wireless devices is a second type of sensor operated by a second operator.

13. The system of claim 11, further comprising a sensor host system that communicates with the first set of wireless devices via the host-neutral gateway device.

14. The system of claim 11, wherein the first set of wireless devices comprises parking space sensors.

15. A method for using a host-neutral gateway device, the method comprising:
receiving, by the host-neutral gateway device, a data packet from a wireless device;
performing, by the host-neutral gateway device, an analysis on the data packet;
determining, by the host-neutral gateway device, to process the data packet from the wireless device locally in response to performing the analysis on the data packet;
providing, by the host-neutral gateway device, the data packet to a locally-executed operator-specific application, wherein:
the host-neutral gateway device executes a plurality of operator-specific applications, wherein each operator-specific application of the plurality of operator-specific applications corresponds to a different set of wireless devices in communication with the host-neutral gateway device;
processing, by the host-neutral gateway device, the data packet using the locally-executed operator-specific application;
transmitting, by the host-neutral gateway device, data based at least in part on the processed data packet to a remote server system;
determining, by the host-neutral gateway device, whether an IP address assigned to the host-neutral gateway device falls within a range of permissible IP addresses; and
disabling, by the host-neutral gateway device, execution of the plurality of operator-specific applications based on determining that the IP address falls outside of the range of permissible IP addresses.

16. The method for using the host-neutral gateway device of claim 15, further comprising:
selecting, by operator-specific application, a long-range communication interface, wherein transmitting the data based at least in part on the processed data packet is transmitted using the selected long-range communication interface.

17. The method for using the host-neutral gateway device of claim 16, wherein selecting the long-range communication interface is based at least in part on a message header of the data packet.

18. The method for using the host-neutral gateway device of claim 15, further comprising:
receiving, by the host-neutral gateway device, a second data packet from a second wireless device;
performing, by the host-neutral gateway device, an analysis on the second data packet;
determining, by the host-neutral gateway device, to transmit the second data packet from the second wireless device without locally processing the second data packet based upon a communication routing table; and
transmitting, by the host-neutral gateway device, the second data packet to a second remote server system.

19. The method for using the host-neutral gateway device of claim 15, further comprising: transmitting a response to the wireless device based on the processed data packet via a local wireless communication interface through which the data packet was received.

* * * * *